March 14, 1933. G. C. LAWSON 1,901,176
METHOD OF WELDING
Filed Jan. 7, 1932   2 Sheets-Sheet 1

Inventor
G. C. Lawson
By Frease and Bishop
Attorneys

March 14, 1933.  G. C. LAWSON  1,901,176
METHOD OF WELDING
Filed Jan. 7, 1932  2 Sheets-Sheet 2

Inventor
G. C. Lawson
By Frease and Bishop
Attorneys

Patented Mar. 14, 1933

1,901,176

UNITED STATES PATENT OFFICE

GOTTFRID C. LAWSON, OF CANTON, OHIO, ASSIGNOR TO THE UNITED METAL PRODUCTS COMPANY, OF CANTON, OHIO, A CORPORATION OF OHIO

METHOD OF WELDING

Application filed January 7, 1932. Serial No. 585,277.

The invention relates to the manufacture of sheet metal doors and the like, and more especially to an improved method of welding flush panel doors and similar structures in which two spaced flat sheets are connected to the edge portions of intervening metal strips.

Under present practice, flush panel doors and similar structures are welded together by forming spaced lugs along opposite edges of the metal strips located between the panel sheets of the door, said strips being welded to the sheets by means of a welding machine of usual and well known construction which applies pressure against the sheets at points adjacent to the lugs and passes current through the sheets and transversely through the strips between opposite lugs thereon, fusing the lugs and welding them to the adjacent portions of the sheets.

It has been found that by this method of welding the strips to the outer sheets, depressions are formed in the sheets at the points where they are welded to the strip. These depressions considerably mar the appearance of the door and in order to compensate for the same it is necessary to fill them with the putty composition ordinarily used for covering the surfaces of metal doors and the like. Even with this putty filling it is not possible to produce a flat surface upon the outside of the finished door.

The object of the present improvement is to provide a method of welding such structures together so that no depressions are formed in the sheets, the outer sides of which will present uniform flat surfaces when finished.

It is believed that the depressions produced in the sheets by present practice of welding are due to the heating of the central or inner portion of the strip between lugs causing a shrinkage in the width of the strip as the same contracts upon cooling.

The objects of the present improvement may be attained by forming apertures or openings in the edge portions of the strip adjacent to the lugs so as to prevent the central or inner portion of the strip from becoming highly heated by the welding operation, thus preventing transverse shrinkage of the strip and producing a finished article in which the outer surfaces of the sheets are flat and uniform throughout.

Figure 1:
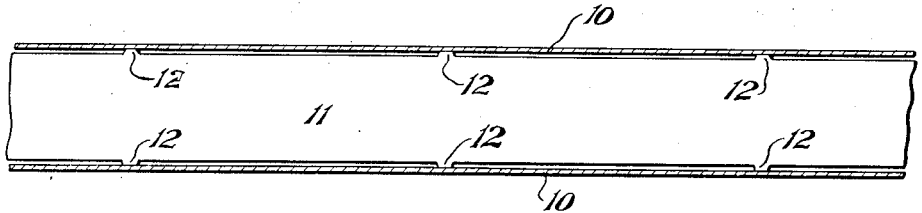
Figure 2:
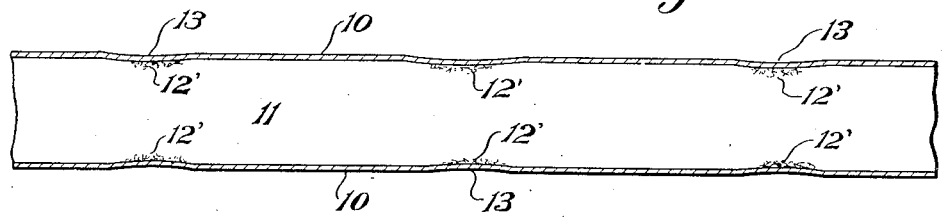
Figure 3:
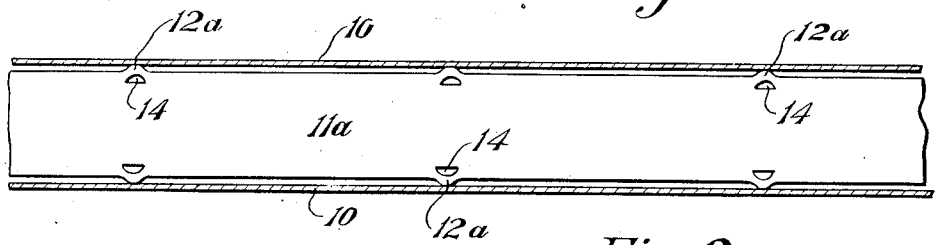
Figure 4:
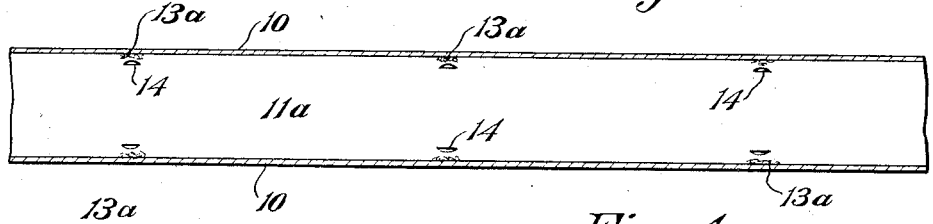
Figure 10:
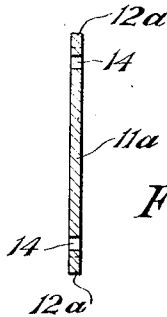
Figure 11:
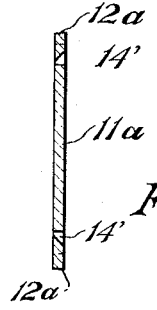
Figure 5:
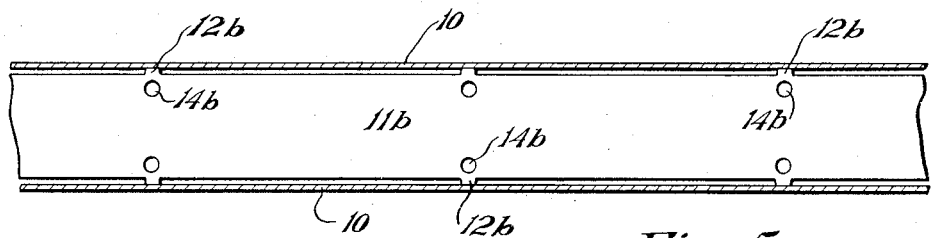
Figure 6:
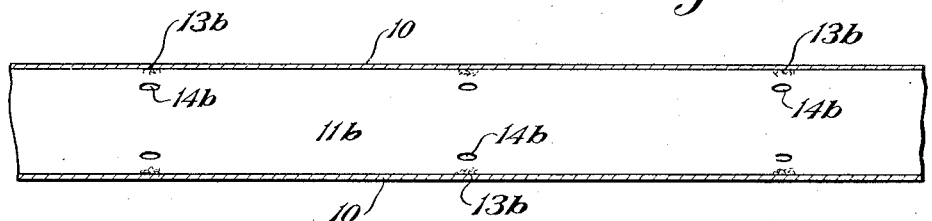
Figure 7:
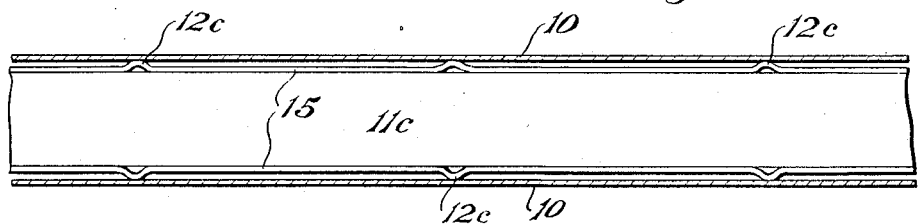
Figure 8:
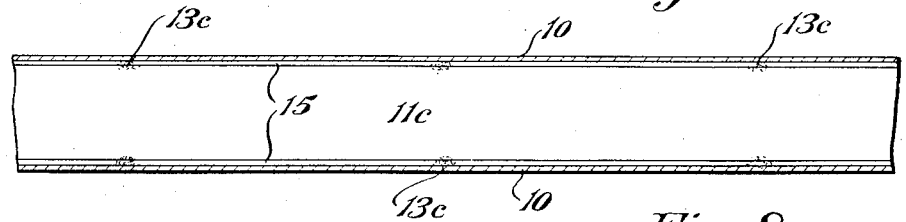
Figure 9:
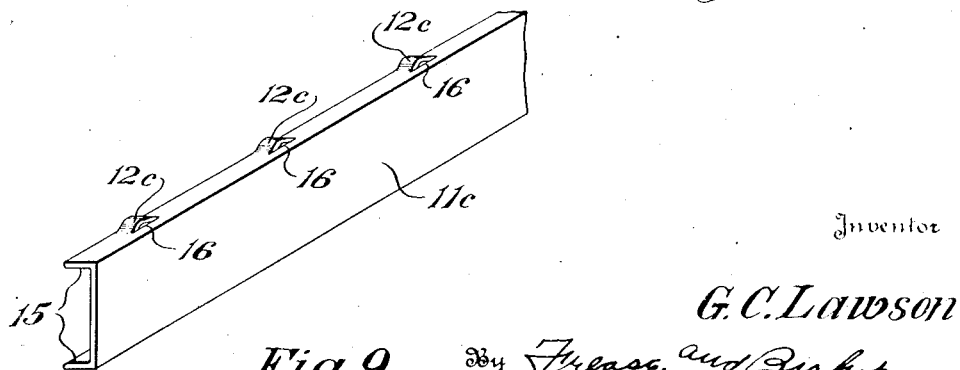

An embodiment of the invention is illustrated in the accompanying drawings, in which Figure 1 is a transverse sectional view through a portion of a flush panel door or the like in position for welding under the present practice;

Fig. 2, a similar view showing the same after welding;

Fig. 3, a view similar to Fig. 1, showing one method of carrying out the present invention;

Fig. 4, a similar view showing the parts after welding;

Fig. 5, a view similar to Fig. 3, showing a slightly modified form of the invention;

Fig. 6, a similar view showing the parts after welding;

Fig. 7, a view similar to Fig. 3, showing another modification of the invention;

Fig. 8, a similar view showing the parts after welding;

Fig. 9, a fragmentary perspective view of a portion of one of the strips shown in Figs. 7 and 8;

Fig. 10, an enlarged transverse sectional view through the strip shown in Fig. 3; and Fig. 11, a similar view showing a slightly modified form of strip.

Similar numerals refer to similar parts throughout the drawings.

In Figs. 1 and 2 is illustrated the usual method of constructing flush panel doors and the like in which the door consists of two metallic sheets or plates 10 between which are arranged a plurality of flat sheet metal strips 11 located in planes transverse to the planes of the surface sheets 10 and provided at a plurality of separated points along their edges with lugs or projections 12.

The projections along one edge of each strip 11 are directly opposite those on the opposite edge, so that when joining the parts together the welding current may be passed through one sheet 10 to a lug 12 on the underlying strip 11 and then through the lug 12 on the opposite edge of the strip and through the opposite sheet 10, thus effecting two welds at one operation.

In Fig. 2 is illustrated the structure shown in Fig. 1 after the welding operations have been completed, welds 12' being formed between the strip 11 and surface sheets 10 at each point where the lugs 12 were originally located upon the strip.

By forming these two welds in a single operation, not only the lugs and adjacent portions of the surface sheets are heated to a high temperature, but by conductivity the central or inner portion of the strip is heated to such an extent that upon cooling the strip contracts at the points adjacent to the welds, pulling the surface sheets inward and forming depressions 13 which are very unsightly in the finished door.

In order to overcome this difficulty and to provide uniform flat surfaces upon both of the surface sheets, the present invention contemplates the forming of openings or apertures in the transverse strips adjacent to the lugs thereon so as to prevent the central portion of the strip from being highly heated by conductivity from the portions of the structure which are heated to high temperature in the welding operation, thus obviating the possibility of the strip shrinking or contracting after the welding operation.

The invention may be carried out as shown in Figs. 3 and 4 in which the strip 11a is located between the surface sheets 10 in usual manner and provided at spaced intervals on opposite edges with lugs or projections 12a, openings or apertures 14 being provided in the edge portions of the strip adjacent to and transversely alined with said lugs.

The lugs may be formed by punching or slitting the strip near its edge, punching the lug outward forming a substantially half-round aperture as shown at 14. These apertures may be straight through the strip as at 14 in Fig. 10 or may be tapered as shown at 14' in Fig. 11, being formed by a bevel edged tool or the like.

With the parts placed in the position shown in Fig. 3, electric current and pressure are applied to the surface sheets 10 at points adjacent to the lugs 12a, heating the lugs to welding temperature and pressing them inward, forming welds between the surface sheets and the strip as indicated at 13a, the apertures 14 being substantially closed by the welding operation, as shown in Fig. 4.

Since the apertures 14 prevent the heat of the portions being welded from being conducted toward the center of the strip, there is no contracting or transverse shrinking of the strip, providing flat uniform surfaces upon the sheets 10, as shown in said figure.

The width of the lug 12a as well as the length thereof should vary in accordance with the thickness of the strip 11a. The length of the lug should be between two and three times its width to obtain the best results and the width of the lug should decrease as the thickness of the strip is increased in order that the proper volume of metal be maintained in the lug to produce the best results in welding.

The invention may be carried out by forming the lugs 12b upon the strip 11b in the manner shown in Fig. 5 and providing substantially circular apertures 14b in the edge portions of the strip adjacent to and preferably transversely alined with said lugs for the purpose of preventing heating of the central portion of the strip by conductivity from the heat of the weld.

The surface sheets 10 are placed against the lugs as shown in Fig. 5 and the welding is accomplished in usual manner, melting down the lugs and forming welds as at 13b, between the strip and the surface sheets, and distorting the apertures 14b to elliptical shape as shown in Fig. 6.

If desired, the strips may be of channel form as shown at 11c in Figs. 7, 8 and 9, being provided at their edge portions with the angular flanges 15.

Each flange is slit at intervals at points spaced from the outer edge thereof as shown at 16 and the metal between said slit and the outer edge of the flange is pressed outward, forming a projection or lug 12c against which the surface sheets 10 are adapted to be placed.

When the parts are welded as in usual practice, they assume the position shown in Fig. 8, the surface sheets 10 being welded to the flanges 15 of the strip 11c as at 13c, the outer surface of the sheets 10 being flat and uniform throughout.

It will thus be seen that under the invention above described in detail flush panel doors and the like may be formed so that there are no depressions in the surface sheets at the points where the welds are formed, this being made possible by the formation of apertures or openings in the edge portions of the transverse strips adjacent to the projections or lugs thereon so as to prevent heating of the central or inner portion of the strip, thus obviating the contraction or shrinking of the strip in width at points adjacent to the welds.

The improved method of welding disclosed herein produces a more resilient or elastic weld than is possible by the old way of welding the surface sheets direct to the strip. This resilience or elasticity is especially desirable in structures such as doors and the like which are subjected to considerable vibration in use.

It has been found by experience that the improved method of welding requires about twenty per cent less electric power to weld the parts together than is required by the old method, thus not only producing a better structure physically as well as in appearance but lessening the cost over the old method.

I claim:

1. The method of welding a sheet metal door and the like, consisting in forming projections upon opposite edges of a metal strip and forming openings in the edge portions of the strip adjacent to and transversely alined with said projections, placing the strip between two parallel sheet metal plates with the strip disposed in a plane transverse to the planes of said plates, and then welding the plates to said strip through said projections.

2. The method of welding a sheet metal door and the like, consisting in forming projections upon opposite edges of a metal strip and forming substantially half-round openings in the edge portions of the strip adjacent to and transversely alined with said projections, placing the strip between two parallel sheet metal plates with the strip disposed in a plane transverse to the planes of said plates, and then welding the plates to said strip through said projections.

3. The method of welding a sheet metal door and the like, consisting in forming projections upon opposite edges of a metal strip and forming substantially round openings in the edge portions of the strip adjacent to and transversely alined with said projections, placing the strip between two parallel sheet metal plates with the strip disposed in a plane transverse to the planes of said plates, and then welding the plates to said strip through said projections.

4. The method of welding a sheet metal door and the like, consisting in forming substantially half-round projections upon opposite edges of a metal strip and forming substantially half-round openings in the edge portions of the strip adjacent to and transversely alined with said projections, placing the strip between two parallel sheet metal plates with the strip disposed in a plane transverse to the planes of said plates, and then welding the plates to said strip through said projections.

5. The method of welding a sheet metal door and the like, consisting in forming projections upon opposite edges of a metal strip by punching openings in the edge portions of the strip and punching the edges of the strip outward adjacent to said openings, placing the strip between two parallel sheet metal plates with the strip disposed in a plane transverse to the planes of said plates, and then welding the plates to said strip through said projections.

6. The method of welding a sheet metal door and the like, consisting in forming angular flanges at opposite edges of a metal strip, cutting spaced slits in said flanges at points spaced from the edges thereof, punching the edge portions of the flanges outward forming projections adjacent to said slits, placing the strip between two parallel sheet metal plates with the strip disposed in a plane transverse to the planes of said plates, and then welding the plates to the strip through said projections.

7. The method of welding a sheet metal door and the like, consisting in forming angular flanges at opposite edges of a metal strip, cutting slits in said flanges, punching portions of the flanges outward forming projections adjacent to said slits, placing the strip between two parallel sheet metal plates with the strip disposed in a plane transverse to the planes of said plates, and then welding the plates to the strip through said projections.

In testimony that I claim the above, I have hereunto subscribed my name.

GOTTFRID C. LAWSON.